(12) United States Patent
Ambal et al.

(10) Patent No.: US 10,999,109 B2
(45) Date of Patent: May 4, 2021

(54) DEVICE AND METHOD TO TRANSFORM DISCRETE VOLTAGE PULSES TO A PHASE-SENSITIVE CONTINUOUS SIGNAL

(71) Applicants: UNIVERSITY OF MARYLAND, COLLEGE PARK, College Park, MD (US); NATIONAL INSTITUTE OF STANDARDS & TECHNOLOGY, Gaithersburg, MD (US)

(72) Inventors: Kapildeb Ambal, Gaithersburg, MD (US); Robert D. McMichael, Montgomery Village, MD (US)

(73) Assignees: UNIVERSITY OF MARYLAND, COLLEGE PARK, College Park, MD (US); NATIONAL INSTITUTE OF STANDARDS & TECHNOLOGY, Gaithersburg, MD (US)

( * ) Notice: Subject to any disclaimer, the term of this patent is extended or adjusted under 35 U.S.C. 154(b) by 0 days.

(21) Appl. No.: 16/519,755

(22) Filed: Jul. 23, 2019

(65) Prior Publication Data
US 2020/0059388 A1 Feb. 20, 2020

Related U.S. Application Data

(60) Provisional application No. 62/702,129, filed on Jul. 23, 2018.

(51) Int. Cl.
*H04L 27/06* (2006.01)
*H04L 27/14* (2006.01)
*H04B 1/16* (2006.01)

(52) U.S. Cl.
CPC ............... *H04L 27/06* (2013.01); *H04B 1/16* (2013.01); *H04L 27/14* (2013.01)

(58) Field of Classification Search
CPC ............ H04L 27/06; H04L 27/14; H04B 1/16
See application file for complete search history.

(56) References Cited

U.S. PATENT DOCUMENTS 5,426,646 A * 6/1995 Slack ................... G06F 11/076
714/704

OTHER PUBLICATIONS

Hannah Clevenson, et al., "Robust High-Dynamic-Range Vector Magnetometry with Nitrogen-Vacancy Centers in Diamond", Applied Physics Letters 112.252406 (2018), (received Apr. 10, 2018; accepted May 21, 2018; published online Jun. 22, 2018), Published by AIP Publishing, 6 pages.

(Continued)

*Primary Examiner* — Kabir A Timory
(74) *Attorney, Agent, or Firm* — Squire Patton Boggs (US) LLP

(57) ABSTRACT

Systems, methods, and apparatuses, for transform discrete voltage pulses to a continuous signal. One method may include receiving a pulsed-voltage signal. The method may also include alternately directing the pulsed-voltage signal between a pair of processing channels based on a modulation signal or another signal. The method may further include determining rate voltages corresponding to the pair of processing channels based on a pulse rate of the pulsed-voltage signal. Further, the method may include processing the rate voltages using low pass filters corresponding to the pair of processing channels to form filtered rate voltages. The method may also include determining a normalized differential output for the pair of processing channels based on the filtered rate voltages. The method may also include outputting the normalized differential output to an output connector.

20 Claims, 9 Drawing Sheets

(56) References Cited

OTHER PUBLICATIONS

Jennifer Schloss, et al., "Simultaneous Broadband Vector Magnetometry Using Solid-State Spins", Physical Review Applied 10, 034044 (2018), 2018 American Physical Society, (Received Mar. 14, 2018; revised manuscript received Jul. 19, 2018; published Sep. 21, 2018), 16 pages.

R.S. Schoenfeld and W. Harneit, "Real Time Magnetic Field Sensing and Imaging Using a Single Spin in Diamond," Phys. Rev. Lett. 106, 030802 (2011).

Z. Ma et al., "Magnetometry for precision measurement using frequency-modulation microwave combined efficient photon-collection technique on an ensemble of nitrogen-vacancy centers in diamond," Opt. Express vol. 26, No. 1, 382 (2018).

L. Rondin et al., "Nanoscale magnetic field mapping with a single spin scanning probe magnetometer," Appl. Phys. Lett. 100, 153118 (2012).

H.A.R. El-Ella et al., "Optimised frequency modulation for continuous-wave optical magnetic resonance sensing using nitrogen-vacancy ensembles," Opt. Express 25, 14809 (2017).

Spec sheet for the AD650 chip from Analog Devices, Voltage-to-Frequency and Frequency-to-Voltage Converter. Downloaded from https://www.analog.com/media/en/technical-documentation/data-sheets/AD650.pdf.

* cited by examiner

DEVICE AND METHOD TO TRANSFORM DISCRETE VOLTAGE PULSES TO A PHASE-SENSITIVE CONTINUOUS SIGNAL

CROSS-REFERENCE TO RELATED APPLICATIONS

This application claims priority from U.S. provisional patent application No. 62/702,129 filed on Jul. 23, 2018. The contents of this earlier filed application are hereby incorporated by reference in their entirety.

GOVERNMENT SUPPORT

This invention was made with government support under 70NANB14H209 awarded by NIST. The government has certain rights in the invention.

FIELD

Some example embodiments may generally relate to rate meters. More specifically, certain example embodiments may relate to rate meters capable of transforming discrete voltage pulses to a phase-sensitive continuous signal. Some example embodiments may generally relate to phase-sensitive detection of discrete voltage pulses.

BACKGROUND

In any sensor technology, the signal to noise ratio (SNR) is a key figure of merit. To avoid noise, a well-known method is to use phase sensitive detection, also known as lock-in detection or homodyne detection. Lock-in detection methods provide measurement of a small difference between two signal levels with the advantage that the measurement can be made at a frequency where the noise is small. Unfortunately, discrete/pulsed signals pose problems for conventional lock-in amplifiers because discrete signals demand a wide bandwidth for precision measurement and thus reduce the SNR.

One context in which pulsed signals are processed is counting collected photons. When counting collected photons, the dominant noise source is shot noise, which is primarily limited by the amount of light that is collected. In addition to the intrinsic shot noise, extrinsic noise factors include environmental drift, technical noise of the detection apparatus and fluctuations in both laser power and microwave power. Phase-sensitive detection or lock-in techniques are frequently used to avoid many of these extrinsic noise sources. A lock-in amplifier can make use of a dynamic range when the input is smoothly varying AC voltage. In the case of a large ensemble of nitrogen vacancy ($NV^-$) centers when a diamond is used for photon collection, these signals are available as emitted photoluminescence power within the detection range of regular photo-detectors.

On the other hand, in cases where a single $NV^-$ center or a few $NV^-$ centers are used, for example, to achieve better spatial resolution, the collected photon output power is ≈10 fW, which is below the detection limit of regular photo-detectors. Instead, the photons are often detected using a single-photon detector, such as an avalanche photo diode detector (APD). An APD generates a narrow (≈20 ns) discrete voltage pulse for each detected photon and typical photon count rates are in the range of $10^5$ $s^{-1}$ to $10^6$ $s^{-1}$. Unfortunately, this train of pulses is not compatible with typical lock-in amplifiers. Instead, the conventional approach is to count pulses and communicate the results to a computer for post-processing.

In addition to avoiding extrinsic noise, lock-in detection provides a continuous output signal, which facilitates the use of stabilization and/or control devices, such as proportional-integral-differential (PID) controllers. PID controllers are broadly used for active stabilization of and control of parameters to fixed values or for tracking of uncontrolled parameters.

An example of tracking is the use of magnetic resonance measurements to find and follow a center of a resonance peak, and thereby determine the magnetic field value. For peak tracking applications, frequency modulation with phase-sensitive detection provides a DC error signal that can be used to lock the resonance peak with feedback control of an excitation frequency. This scheme allows rapid field measurements in cases where the field varies by small amounts between measurements. Demonstrations of such active feedback control for real-time magnetometry have been reported using nitrogen-vacancy ($NV^-$) centers in diamond. Large ensembles of $NV^-$ centers emit relatively high photoluminescence power that is detected by conventional photo-detectors. But there are few reports of active feedback control (PID) detection schemes and real-time magnetometry using single $NV^-$ centers or small ensembles of $NV^-$ centers which emit relatively low photoluminescence power and that require single-photon detectors.

When single photon-detectors (e.g., APDs) are needed, it becomes a greater challenge to convert the detector output pulses into a smooth DC signal to be used for phase sensitive detection and peak tracking. Previous work demonstrating peak tracking using single-photon-detector input used photon pulse counting with data transmission to a computer and demodulation and PID control via computer algorithm.

Transmission to a computer for processing in this manner results in several problems. The output from the computer is in a discretized form, which creates difficulties in using the output to control other devices. In addition, transmission to a computer can result in significant delay in processing as the computer may be performing multiple operations at one time.

SUMMARY

One embodiment is directed to a method. The method may include receiving a pulsed-voltage signal. The method may also include alternately directing the pulsed-voltage signal between a pair of processing channels based on a modulation signal or another signal. The method may further include determining rate voltages corresponding to the pair of processing channels based on a pulse rate of the pulsed-voltage signal. The method may also include processing the rate voltages using low pass filters corresponding to the pair of processing channels to form filtered rate voltages. The method may further include determining a normalized differential output for the pair of processing channels based on the filtered rate voltages. The method may also include outputting the normalized differential output to an output connector.

Another embodiment is directed to an apparatus. The apparatus may include a switch. The switch may be configured at least to receive a pulsed-voltage signal. The switch may be configured at least to alternately direct the pulsed-voltage signal between the pair of processing channels based on a modulation signal or another signal. The apparatus may further include voltage pulse integrators corresponding to the pair of processing channels. The voltage pulse integrators may be configured at least to determine rate voltages corresponding to the pair of processing channels based on a pulse rate of the pulsed-voltage signal. The apparatus may further include low pass filters corresponding to the pair of processing channels. The low pass filters may be configured at least to process the rate voltages to form filtered rate voltages. The apparatus may further include circuitry. The circuitry may be configured at least to determine a normalized differential output for the pair of processing channels based on the filtered rate voltages. The circuitry may be configured to output the normalized differential output to an output connector.

Another embodiment is directed to a rate meter. The rate meter may comprise means for receiving a pulsed-voltage signal. The rate meter may also comprise means for alternately directing the pulsed-voltage signal between a pair of processing channels based on a modulation signal or another signal. The rate meter may further comprise means for determining rate voltages corresponding to the pair of processing channels based on a pulse rate of the pulsed-voltage signal. The rate meter may also comprise means for processing the rate voltages using low pass filters corresponding to the pair of processing channels to form filtered rate voltages. The rate meter may further comprise means for determining a normalized differential output for the pair of processing channels based on the filtered rate voltages. The rate meter may further comprise means for outputting the normalized differential output to an output connector.

BRIEF DESCRIPTION OF THE DRAWINGS

For proper understanding of example embodiments, reference should be made to the accompanying drawings, wherein.

DETAILED DESCRIPTION

Figure 1:
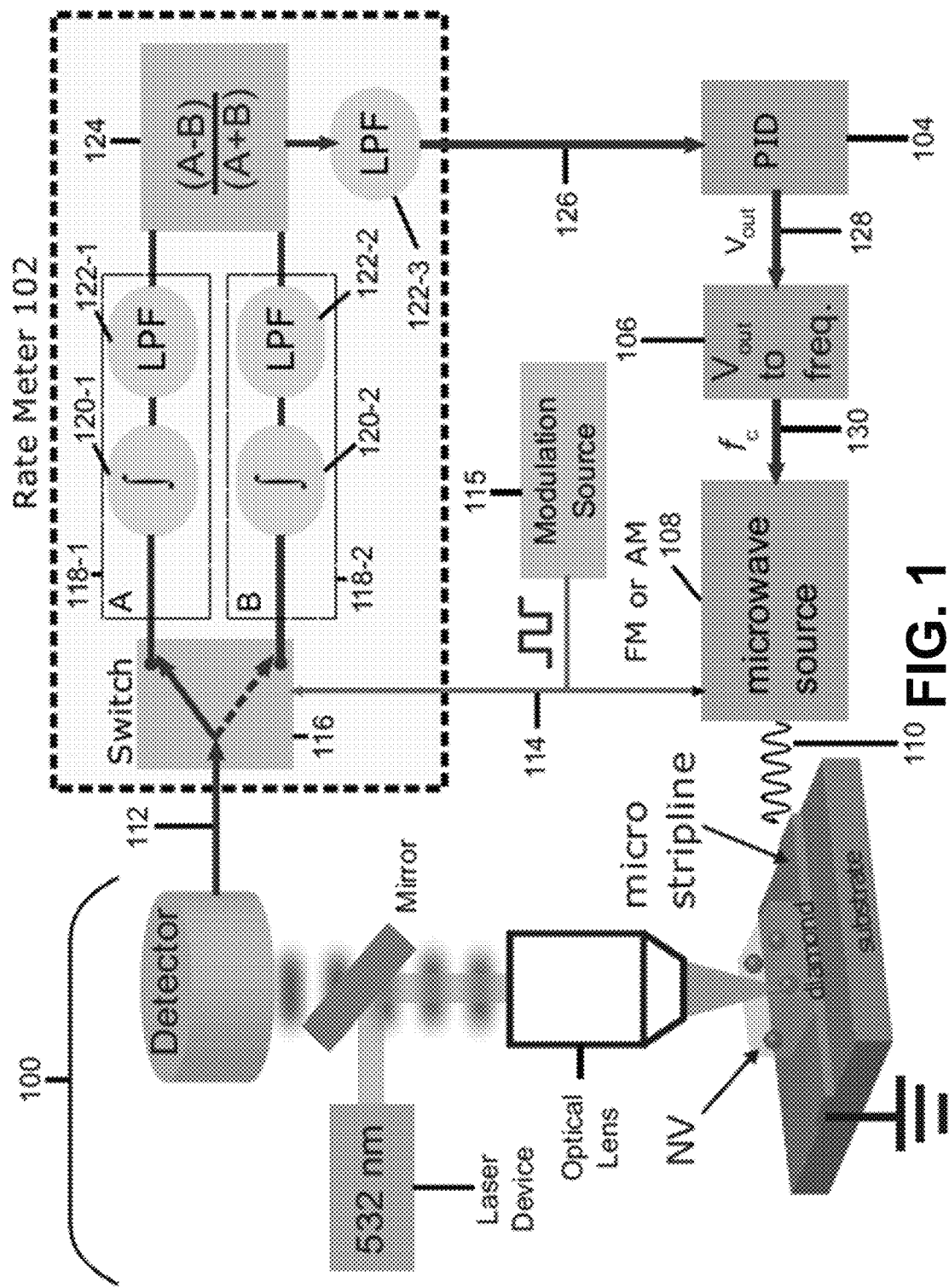
FIG. 1 illustrates a rate meter in the context of a magnetic resonance system, according to an example embodiment.

It will be readily understood that the components of certain example embodiments, as generally described and illustrated in the figures herein, may be arranged and designed in a wide variety of different configurations. Thus, the following detailed description of some example embodiments of systems, methods, and apparatuses for transforming discrete voltage pulses to a phase-sensitive continuous signal, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain example embodiments," "some example embodiments," or other similar language, throughout this specification refers to the fact that a particular feature, structure, or characteristic described in connection with an embodiment may be included in at least one embodiment. Thus, appearances of the phrases "in certain example embodiments," "in some example embodiments," "in other example embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Some embodiments described herein may provide for phase sensitive rate measurement. Specifically, some embodiments may provide a rate meter that performs phase sensitive detection techniques on pulsed input signals. The rate meter may transform discrete voltage pulses to smooth direct current (DC) voltage levels that are proportional to a pulse rate (e.g., the number of pulses per second) and that further performs phase sensitive detection of small changes in the pulse rate. This may provide an amplitude of a change in count rate as a smoothly varying voltage, which may facilitate implementation of closed-loop control of an experimental parameter with a conventional PID controller. The rate meter may be utilized at pulse rates between 2,000 l/s to 500,000 l/s.

In this way, some embodiments described herein may provide for improved signal-to-noise ratio (SNR) relative to other techniques (e.g., where signals or noise are weak, or where precise measurements are needed for both high voltages at pulse peaks and low voltages between peaks in a pulsed-voltage signal). In addition, some embodiments described herein may reduce or eliminate a need to utilize transmission to a separate computer for processing, thereby reducing or eliminating related certain problems described above.

Some embodiments are described in the context of pulsed signals from single-photon detectors, where the rate meter may be used for phase sensitive detection to track a moving peak in a photon rate's response to a changing experimental parameter. In this context, the rate meter may be used for real-time magnetometry by locking and tracking magnetic resonance spectra of $NV^-$ centers in diamond. As such, the rate meter may be used to characterize static magnetic fields and detect ferromagnetic resonance from nanoscale magnetic devices, where the small device volume makes it difficult to use conventional techniques.

In addition, using this context as an example, the rate meter may provide real time data processing and frequency control to lock and track an optically detected magnetic resonance (ODMR) peak of $NV^-$ centers. In addition, some embodiments described herein may facilitate a reduction or elimination of post-processing of the data and may provide sensitivity (e.g., 6 µT/√Hz) comparable to more traditional methods. This sensitivity may be sufficient to measure the small change in stray magnetic field during ferromagnetic resonance of a nanoscale magnetic device.

Certain embodiments described herein have applicability beyond the contexts in which some embodiments are described, for example, to other contexts where information may be encoded in the form of pulse rates and where pulses may need to be transformed into a continuous, smoothly varying readout. For example, some embodiments described herein may be applicable to monitoring the behavior of quantum devices where obtaining a continuous reading of a parameter such as temperature, pressure, magnetic field, and/or the like may involve a transformation of a pulsed signal to a continuously, smoothly varying output. Another example context may include astronomy, where a pulsed signal is obtained by detecting individual photons from a dim celestial object. In this context, some embodiments described herein could facilitate accurate orientation and tracking of celestial objects.

Another example context may include neuromorphic computing, which may use synthetic neurons to perform tasks that are difficult for conventional computer architectures. The synthetic neurons fire, generating voltage pulses, and they do so depending on the rate of pulses sensed at their inputs. Phase sensitive detection of pulse rates, according to some embodiments described herein, may allow the effects of a modulated input to be traced to different locations in an artificial brain, thereby providing a way to characterize the activity of a whole neuromorphic system FIG. 1 illustrates a rate meter in the context of a magnetic resonance system, according to an example embodiment. FIG. 1 shows an experimental setup 100 that includes a laser device to output light (e.g., green light at a wavelength of 532 nanometers (nm)), a mirror that is angled to direct the laser to an optical lens, and the optical lens that focuses the laser light on a diamond that includes NV⁻ centers. As further shown, and with respect to experimental setup 100, the diamond may be proximate to a micro stripline antenna that is used to transmit microwaves. The micro stripline antenna may be mounted on a substrate, such as a circuit board. The experimental setup 100 may further include a detector to detect photons (e.g., red light photons) emitted from the NV⁻ centers.

FIG. 1 further shows a rate meter 102, according to certain embodiments described herein, that is connected to the detector for receiving a pulsed-voltage signal. In addition, the rate meter 102 may be connected to a PID controller 104. The PID controller 104 may be connected to a voltage converter 106, which is connected to a microwave source 108 that provides, at 110, microwaves to the micro stripline antenna.

In FIG. 1, NV⁻ centers may be used as magnetic field sensors. NV⁻ centers may be exited with green laser light and emitted photoluminescence may be collected using a single-photon detector, such as an APD. The detector signal may be sent to the differential rate meter 102, which contains two gated high-speed TTL pulse integrators, low pass filters (LPF) and an analog operation for a normalized differential output, as described elsewhere herein. The PID controller 104 may monitor any changes in the output of the rate-detector and may generate a compensating frequency-control output that tracks the ODMR resonance peak, as described elsewhere herein.

FIG. 1 may include three parts: 1) confocal microscope for optically detected magnetic resonance (ODMR) measurement using NV⁻ center, 2) differential rate meter 102, and 3) frequency locking using a PID controller 104. The confocal microscope for ODMR measurement may include 1) a green laser for excitation, 2) an electromagnet for applied magnetic field, and 3) a microwave antenna for spin resonance excitation. The NV⁻ center may be excited continuously with green laser light (e.g., 532 nm) with nominal illumination ≈100 µW, low enough to avoid optical power related broadening. Emitted photoluminescence (e.g., 600 nm to 800 nm) may be collected and detected by a photo detector. The photodetector may output a 20 ns TTL pulse per detected photon as a pulsed-voltage signal. The photon detection rate may be recorded using a rate-detector as a function of microwave frequencies for ODMR measurement.

At 112, the rate meter 102 may receive the pulsed-voltage signal from the detector. In addition, at 114, the rate meter 102 may receive a modulation signal associated with the microwaves output via the micro stripline antenna. For example, a modulation source 115 may provide the modulation signal to the rate meter 102. In addition, and as further shown at 114, the modulation source 115 may provide the modulation signal to the microwave source 108 to control a modulation of microwaves output by the microwave source 108. In other embodiments, the modulation signal may identify a modulation of magnetic field or another parameter associated with generation of the pulsed-voltage signal. The differential rate meter 102 may work as a demodulator of the frequency modulated photoluminescence signal.

Switch 116 may alternately direct, as the pulsed-voltage signal is received, the pulsed-voltage signal between a pair of processing channels 118 based on a modulation signal or another signal from modulation source 115. For example, the pulsed-voltage signal from the detector may be directed, by switch 116, between the inputs of two parallel channels 118-1 and 118-2 synchronously with the microwave frequency modulation. In each channel, pulses may be integrated at pulse rates from 2 ms⁻¹ to 500 ms⁻¹. As such, voltage pulse integrators 120-1 and 120-2 may determine rate voltages corresponding to a pair of processing channels 118 based on a pulse rate of the pulsed-voltage signal (e.g., may count pulses and may determine the rate voltages from the pulses).

After determining the rate voltages, the rate meter 102 may use low pass filters (LPFs) 122-1 and 122-2 to process the rate voltages, thereby forming filtered rate voltages. For example, an LPF 122 may include a circuit that filters high frequency values to smooth a rate voltage.

A normalized difference may be obtained from the individual channel voltages using an analog multiplier/divider circuit. Specifically, at 124, the rate meter 102 may determine a normalized differential output for a pair of processing channels 118 (e.g., processing channels 118-1 and 118-2). For example, the rate meter 102 may determine the normalized differential output according to the following equation:

$$\text{normalized differential output} = \frac{A-B}{A+B}$$

where A is the filtered rate voltage for processing channel 118-1 and B is the filtered rate voltage for processing channel 118-2. In other words, the normalized differential output may be determined by dividing a difference between a first filtered rate voltage and a second filtered rate voltage (A−B) by a sum of the first filtered rate voltage and the second filtered rate voltage (A+B). The normalized differential output may be processed using LPF 122-3. LPF 122-3 may be configured differently than LPFs 122-1 and 122-2. For example, LPFs 122-1 and 122-2 may be configured to filter at a particular frequency, which may be at or lower than a modulation frequency provided by the modulation source 115. LPF 122-3 may be configured to filter at a particular frequency that is at or lower than LPFs 122-1 and 122-2.

After the normalized differential output is filtered using LPF 122-3, the filtered normalized differential output may be, at 126, output from rate meter 102. For example, the rate meter 102 may output the filtered normalized differential output to PID controller 104. PID controller 104 may monitor error signals using the normalized differential output. At 128, the PID controller 104 may output information that identifies the peak voltage over time ($V_{out}$) to the voltage converter 106. The voltage converter 106 may translate the $V_{out}$ to corresponding frequency values, which may be used as a measurement of $f_c$, described below. At 130, the voltage converter 106 may output $f_c$ to the microwave source 108. The microwave source 108 may adjust a frequency of a signal output by the micro stripline antenna based on movement of $f_c$. This maintains peak voltage, thereby improving a signal received by the rate meter and results obtained by the rate meter. These operations are described in more detail below. In addition, the rate meter 102 may output information that identifies $f_c$ to record $f_c$. Further, the rate meter 102 may output information to a computer, a server, and/or the like for generation and/or display of charts, computations, and/or the like based on operations of the rate meter 102.

The rate meter 102 may be used with either amplitude modulation or frequency modulation. For amplitude modulated (AM) ODMR measurements, the microwave power may be alternated between ON and OFF states. In the OFF state, green laser light continuously pumps the NV⁻ centers into the bright |0> spin state, while in the ON state, photoluminescence will be reduced if microwaves of an appropriate frequency drive spins into |−1> and |+1> states. The normalized differential output (A−B)/(A+B) may be recorded as a function of microwave frequency. Results are shown in, and described with respect to, FIG. 2 below.

For frequency modulated (FM) ODMR measurements, and for peak locking, the microwave frequency may be alternated between two frequencies, $f_1$ and $f_2$, around a center frequency, $f_c$. Channel-A may be open while the frequency is $f_1$ and channel-B may be open while the frequency is $f_2$. Similar to the amplitude-modulated case, the frequency-modulated, normalized difference, ODMR spectrum is recorded as a function of microwave frequencies ($f_c$) as shown in, and described with respect to, FIG. 3 below.

The derivative-like line shape of the frequency-modulated signal may provide an error signal for locking the resonance peak. Near resonance, the signal may be positive if the driving frequency is above resonance, and negative if the driving frequency is below resonance. Active feedback may be used to generate a frequency-correction signal that adjusts the microwave frequency. Digitizing the correction signal and using computer control of the microwave generator frequency may yield good performance. The slope of the frequency modulated signal may be used as a voltage-to-frequency conversion factor.

In this way, and as described above, the phase sensitive rate meter 102 may accept a pulsed-voltage input and a periodic modulation input, and may provide an output voltage proportional to a normalized difference (A−B)/(A+B) where A and B are the time-averaged pulse rates measured when the modulation input is high and low, respectively. The input signal may be routed alternately between two independent pulse processing channels 118, depending on whether the modulation input is above or below a threshold value, such as a threshold voltage. This directing process may multiply the input signal by square-wave signal, thereby providing the phase sensitive detection characteristic. The comparable function in an analog lock-in amplifier is provided by a mixer that multiplies the input and modulation signals and, therefore, some embodiments described herein provide certain advantages relative to an analog lock-in amplifier, as described elsewhere herein.

After receiving a pulsed-voltage signal, the rate meter 102 may generate a modified pulsed-voltage signal by applying a uniform amplitude and a uniform duration to pulses of the pulsed-voltage signal (e.g., using other circuitry shown in FIG. 1) and may determine rate voltages, described herein, based on the modified pulsed-voltage signal. For example, each processing channel may include pulse conditioning and counting. To compensate for the fact that input pulses may have different amplitudes or durations, the pulse conditioning may create pulses with uniform amplitude and duration, one for each input pulse. In each channel, the train of uniform pulses may then be integrated using a frequency to voltage converter, providing an analog voltage proportional to the pulse rate in that channel. The processing channel voltages, i.e., count rates A and B, may be provided as outputs. Following processing of the input pulses, the count rate voltages may be inverted (or not) and added to provide A−B and A+B voltages. These voltages may be divided using a multiplier/divider to produce a voltage proportional to the normalized difference (A−B)/(A+B), which is then provided at an output connector.

Figure 2:
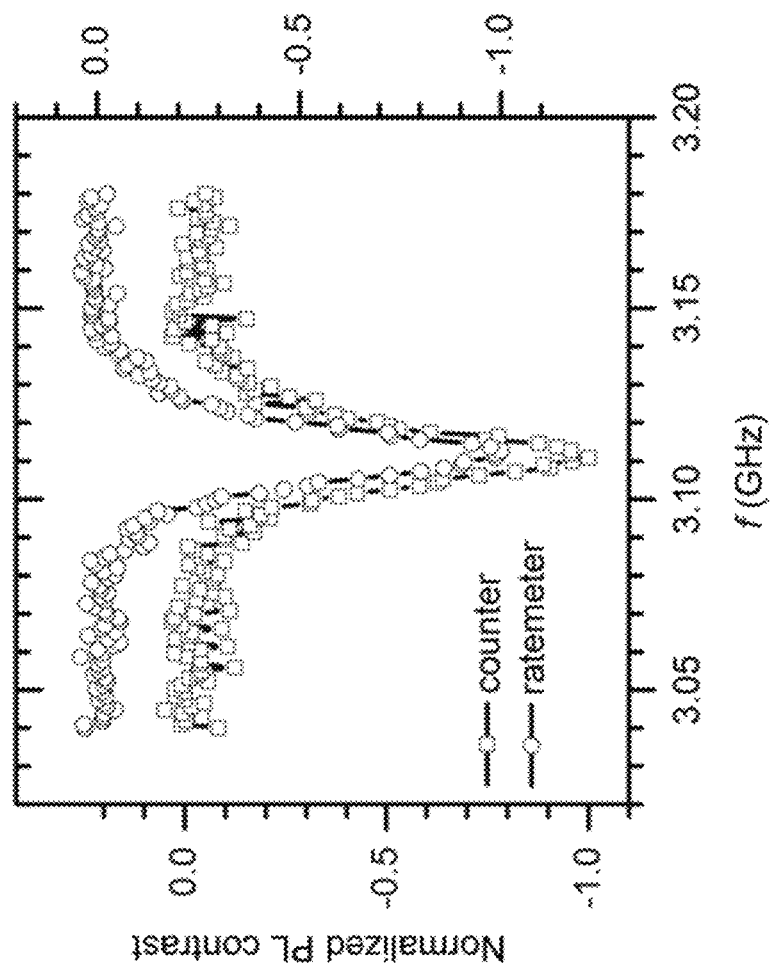
FIG. 2 illustrates an amplitude-modulated, optically detected magnetic resonance (ODMR) spectrum measured using the rate meter of FIG. 1, according to an example embodiment.

FIG. 2 illustrates an amplitude modulated ODMR spectrum measured using the rate meter of FIG. 1, according to an example embodiment. Specifically, FIG. 2 shows a comparison of results obtained using a rate meter described herein (e.g., rate meter 102) with results from a more conventional method of direct pulse counting. The data sets shown in FIG. 2 are offset for better visibility. The circles represent data recorded using the rate meter described herein and the squares represent data recorded using pulse counters in accordance with conventional methods.

To produce the example of FIG. 2, a microwave amplitude modulated ODMR spectra was measured at a fixed applied magnetic field, and data was recorded for the two methods simultaneously, using the same pulse signal. In this measurement, microwave power was modulated at 50 Hertz (Hz): ON for 10 milliseconds (ms) and OFF for subsequent 10 ms in each cycle. The average emitted photon rate was 300 ms⁻¹ and the average incident laser power was 112 µW. ODMR spectra from both measurements were normalized as shown in FIG. 2. The square points are from the conventional photon counting method and circular points are from the method using the rate meter described herein. As shown in FIG. 2 the signal-to-noise (SNR) from the two methods are virtually identical.

Figure 3:
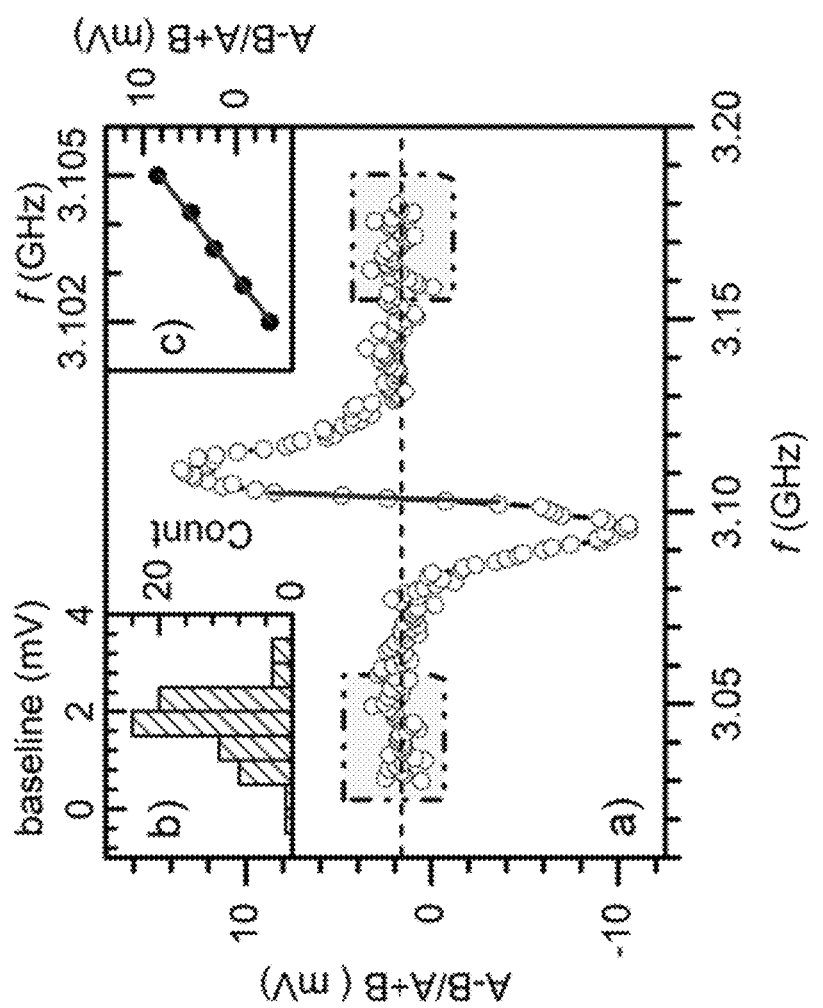
FIG. 3 illustrates various results obtained using the rate meter of FIG. 1, according to an example embodiment.

As is shown from FIG. 2, similar results may be obtained with the circuitry of the embodiments described herein as with the conventional processing using a computer. Thus, some embodiments described herein reduce or eliminate a need for processing by a computer, which conserves computing resources and/or reduces an amount of time for obtaining a result FIG. 3 illustrates various results obtained using the rate meter of FIG. 1, according to an example embodiment. Plot a) illustrates frequency modulated ODMR spectrum of NV⁻ centers measured using a rate meter described herein. The rate of frequency modulation was 200 Hz with an amplitude of 5 MHz. Plot b) illustrates the histogram of background noise taken from the data points shown as dotted boxes in plot a). Plot c) shows a fit to points nearest the zero crossing of plot a).

A field-dependence of the ODMR signal may be used for magnetometry. The noise floor of a field measurement δB can be determined from the signal noise $\delta S_{FM}$ of a frequency-modulated measurement using the following equation:

$$\delta B = \frac{dB}{df}\left(\frac{dS_{FM}}{df_c}\right)^{-1}\delta S_{FM}.$$

The differential sensitivity, $$\frac{dS_{FM}}{df_c},$$

is obtained from the frequency modulated ODMR spectrum as shown in plot a) of FIG. 3. In this measurement, microwaves were frequency modulated (FM) using a square wave. The modulation rate was 200 Hz and the modulation amplitude was 5 MHz. Rate-detector A (e.g., a first processing channel 118) received all the photons while the microwave frequency was high, ($f_1 = f_c + 5$ MHz) and rate-detector B (e.g., a second processing channel 118) received all the photons while the microwave frequency was low ($f_2 = f_c - 5$ MHz). The normalized difference output was measured as function of center microwave frequency ($f_c$) for an integration time of 1 s per point. The noise level was determined from the off-resonance background as shown in the dotted boxes.

The histogram of the background signal is shown in plot b) of FIG. 3. The standard deviation is 0.65 mV. The frequency sensitivity was determined from a linear fit of the data points around the zero-crossing. The fit is shown as the solid lines in plots a) and c). The measured slope for this fit is $3.96 \times 10^{-6}$ mV/Hz. Therefore, the measured frequency sensitivity was 165 kHz/Hz$^{1/2}$, which translates into a field sensitivity of 5.85 μT/Hz$^{1/2}$.

Figure 4:
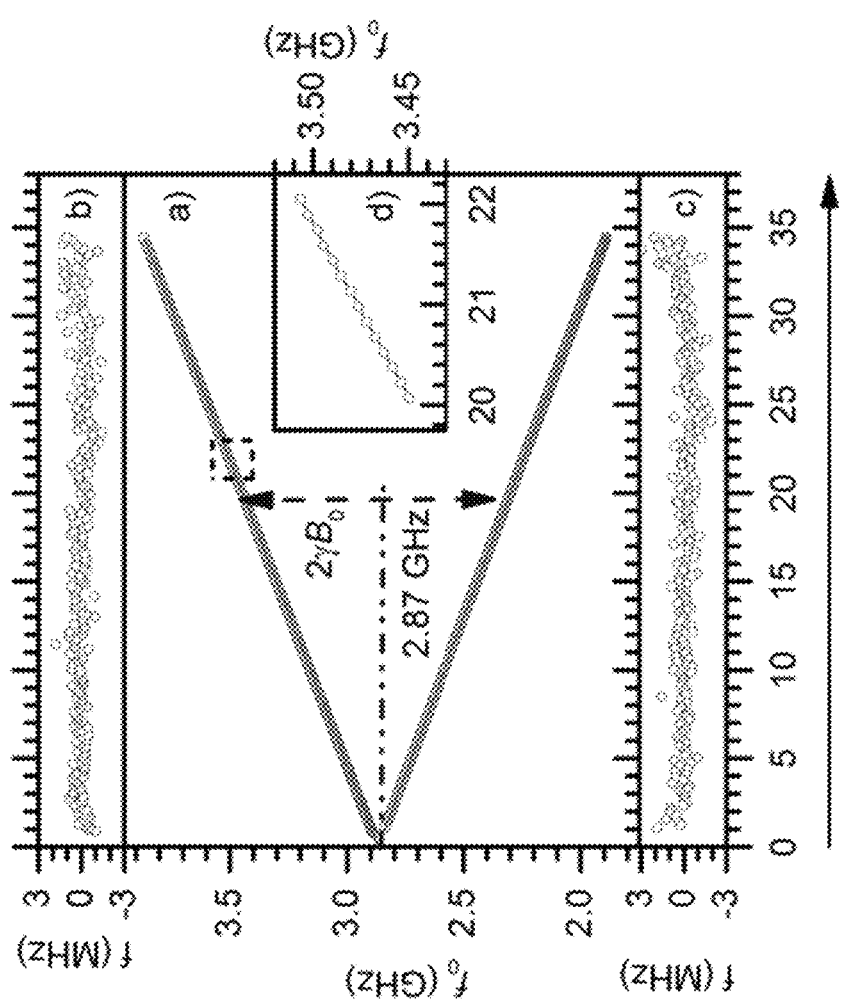
FIG. 4 illustrates a magnetic field measurement using the rate meter of FIG. 1, according to an example embodiment.

FIG. 4 illustrates a magnetic field measurement using the rate meter of FIG. 1, according to an example embodiment. Specifically, FIG. 4 shows magnetic field measurement using a rate meter described herein (e.g., rate meter 102) and a PID controller (e.g., PID controller 104) for peak tracking. Plot a) illustrates the Zeeman effect of NV$^-$ centers measured by tracking the resonance peaks. Plots b) and c) illustrate the residual of linear fits of the Zeeman effect. Plot d) is a magnified portion of the upper curve from 20 mT to 22 mT.

FIG. 4 illustrates the peak tracking method for a wide-range magnetic field measurement. In this measurement, the magnetic resonance peaks of NV$^-$ centers are locked and tracked from near zero magnetic field to 35 mT, revealing the Zeeman splitting of NV$^-$ center as shown in plot a). Near zero magnetic field, the tracking feedback loop becomes unstable as the two resonance peaks overlap. The magnetic field (bottom axis of plot a)) was independently measured using a Hall probe placed near the sample. The result in plot a) is in agreement with expected Zeeman splitting and it also shows the linearity of the probe and the detection scheme over wide magnetic field range. The intercepts from the linear fits are virtually identical: (2.868±0.001) GHz and (2.869±0.001) GHz in agreement with the expected zero field splitting of the NV$^-$ center. Uncertainties shown here are the uncertainty in the field offset of a Hall probe. The uncertainty estimates from the standard deviations of the fit parameters are approximately 0.7 MHz. Plots b) and c) display the corresponding fit residual. Plot d) is the portion of plot a) shown in dotted box from 20 mT to 22 mT and shows individual data points.

The potential field range of this measurement scheme may be determined by the frequency range of microwave components such as the microwave source, RF cables, and the micro-stripline antenna. The maximum field of the small, air-cooled electromagnet used may limit this demonstration.

Figure 5:
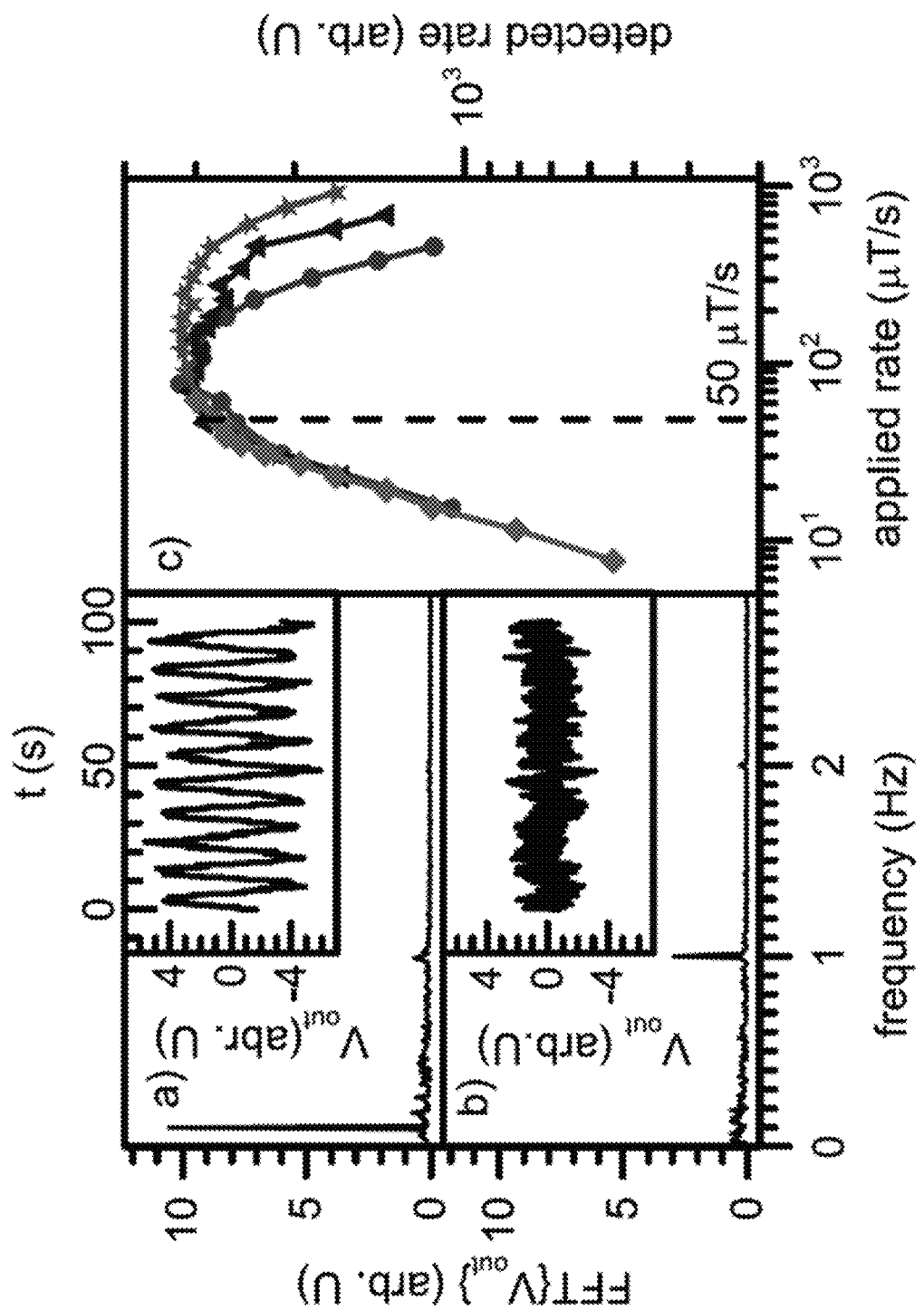
FIG. 5 illustrates real-time data processing and frequency control using the rate meter of FIG. 1 and feedback control, according to an example embodiment.

FIG. 5 illustrates real-time data processing and frequency control using the rate meter of FIG. 1 and feedback control, according to an example embodiment. Specifically, FIG. 5 illustrates real-time data processing and frequency control using a rate meter and feedback control described herein. Plots a) and b) are the FFTs of time traces of $V_{out}$ (128 in FIG. 1) as shown in the respective insets. The oscillating magnetic field amplitude is 154 μT/s, and the frequencies were 0.1 Hz and 1 Hz. Plot c) illustrates the measured maximum field sweep rate plotted against the maximum sweep rate of the applied field.

To demonstrate real-time data processing, frequency control, and field tracking of the feedback scheme, an oscillating magnetic field of the form $B(t) = B_0 \cos(2\pi ft)$ with various frequencies f and amplitudes $B_0$ were applied. In plots a) and b), the applied oscillating magnetic field amplitude $B_0$ was 154 μT and frequencies were 0.1 Hz and 1 Hz correspondingly. The insets of plots a) and b) are the time traces of the feedback output in real-time. The sampling time for this measurement was 20 ms. Plot c) compares the maximum magnetic field sweep rate, $2\pi f B_0$, measured by the real-time feedback scheme with the maximum sweep rate measured using the Hall probe.

The x-axis of plot c) is the maximum magnetic field sweep rate measured using a Hall probe placed near the sample, and the y-axis of plot c) is the rate of change detected by the feedback loop. The square data points of plot c) are measured by applying sinusoidal varying magnetic field of variable amplitude at a frequency of 0.1 Hz. The circle, triangular, and star data points are measured in the frequency range of 0.1 Hz to 3 Hz for a fixed amplitude.

The oscillating magnetic field amplitudes of these measurements were 154 μT, 231 μT and 308 μT, respectively. Plot c) shows that at lower rates, the feedback system may exactly follow the applied oscillating magnetic field, but at a rate higher than approximately 50 μT/s, the feedback scheme may be unable to follow the change in the magnetic field.

Figure 6:
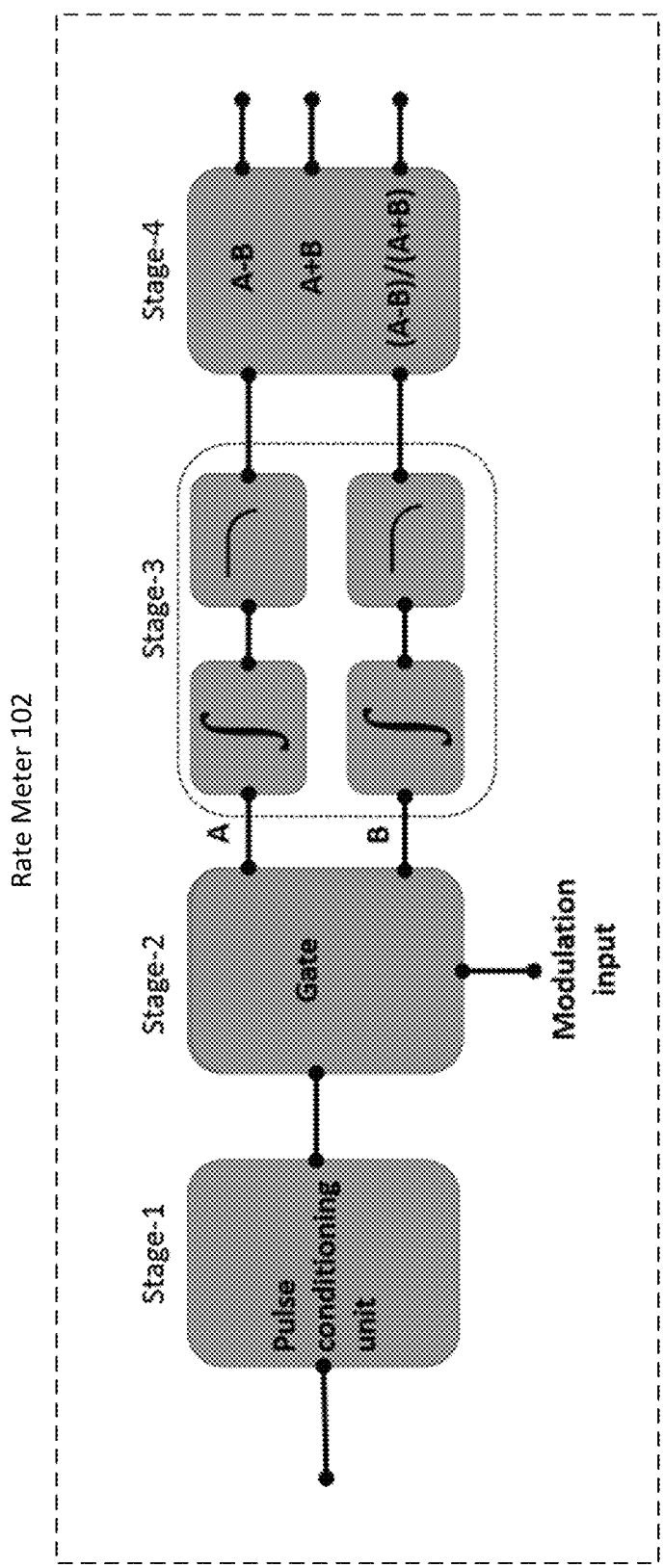
FIG. 6 illustrates a block diagram of the rate meter of FIG. 1, according to an example embodiment.

FIG. 6 illustrates a block diagram of the rate meter of FIG. 1, according to an example embodiment. Specifically, FIG. 6 illustrates a block diagram of the rate meter described herein (e.g., rate meter 102 that functions as a lock-in amplifier for a discrete signal). As shown, in FIG. 6, there may be four stages: 1) a pulse conditioning stage that converts all of the incoming pulses to a pre-designed amplitude and width, 2) a gating stage to route the pulses synchronously with the y sync the modulation and, 3) two channels that may include fast integrators to integrate the voltage pulses and that may include low pass filters (LPF) to remove high frequency noise, and 4) analog operation to generate a desired output signal.

The first stage may make each pulse received by the rate meter uniform in amplitude and duration. This conditioning may remove possible ambiguity due to deformation of the pulses in the transmission line. Pulse conditioning may enhance the signal by amplifying the pulse amplitude and/or extending the pulse duration. These amplifications may increase the signal to noise (SNR) of the pulsed signal.

The second stage may handle the modulation signal. At the center of this stage may be a switch that may route the pulses without deforming their shape and size. Apart from the switching circuit, this stage may also have functionality to operate an independent control gate for each processing channel (shown as A and B). The duty cycle of modulation is not limited to 50%. Some embodiments may provide for a range of modulation frequency as low as 100 Hz and as high as 100 kHz or higher.

The third stage may be a two-channel high speed voltage pulse integrator. Each integrator may be implemented as a frequency-to-voltage circuit based on a voltage-controlled oscillator with negative feedback regulation. Each integrator may function at pulse rates from $2 \times 10^3$ s$^{-1}$ to $500 \times 10^3$ s$^{-1}$ and may project pulse rates in 10 V scale. The scale range of the individual integrator may be chosen from pre-set values, such as, for example, 2 k, 5 k, 10 k, 20 k, 50 k, 100 k, 200 k, and 500 k. The output of each integrator may then be filtered using LPFs of specific pre-defined time constants, such as, for example, 100 µs, 1 ms, 10 ms, 100 ms and 1 second (s). The fourth stage may perform the analog operation of the output voltages from the integrators.

The fourth stage may be circuitry or other device capable of performing operations analogous to addition, subtraction, multiplication and/or division of voltages. The fourth stage may supply voltages corresponding to a count rate difference A−B, a count rate sum A+B, and/or a normalized differential count rate (A−B)/(A+B).

Figure 7:
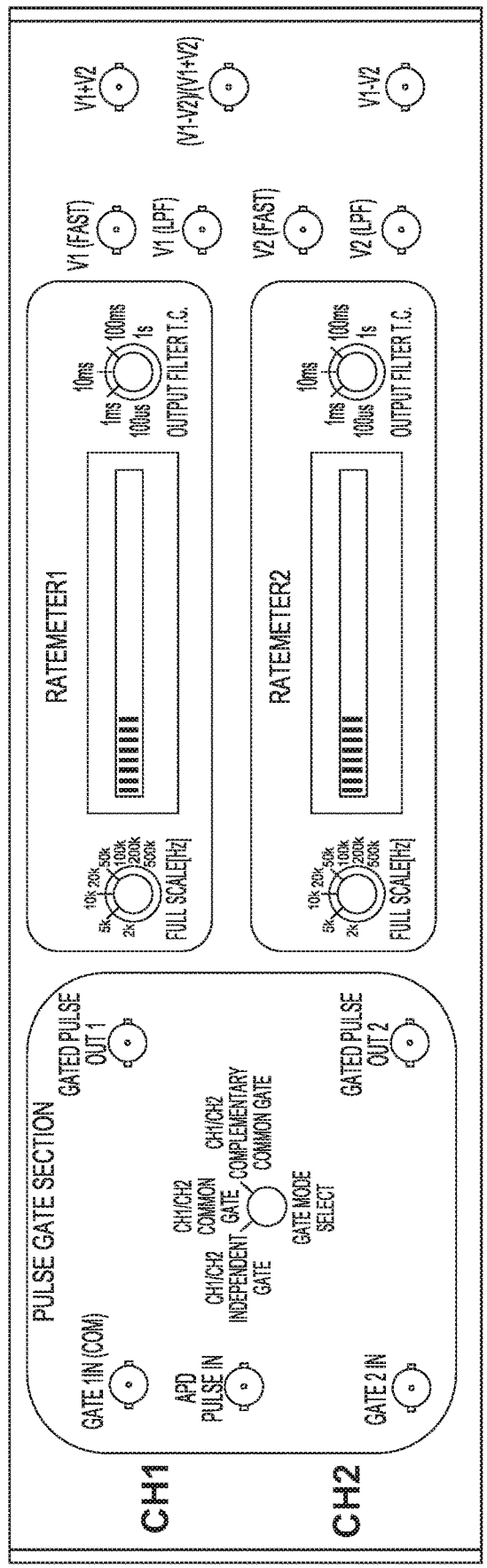
FIG. 7 illustrates a front panel of the rate meter of FIG. 1, according to an example embodiment.

FIG. 7 illustrates a front panel of the rate meter of FIG. 1, according to an example embodiment. For example, the front panel may include various controls for pulse gate selection, various parameters, LPFs, and normalization.

Figure 8:
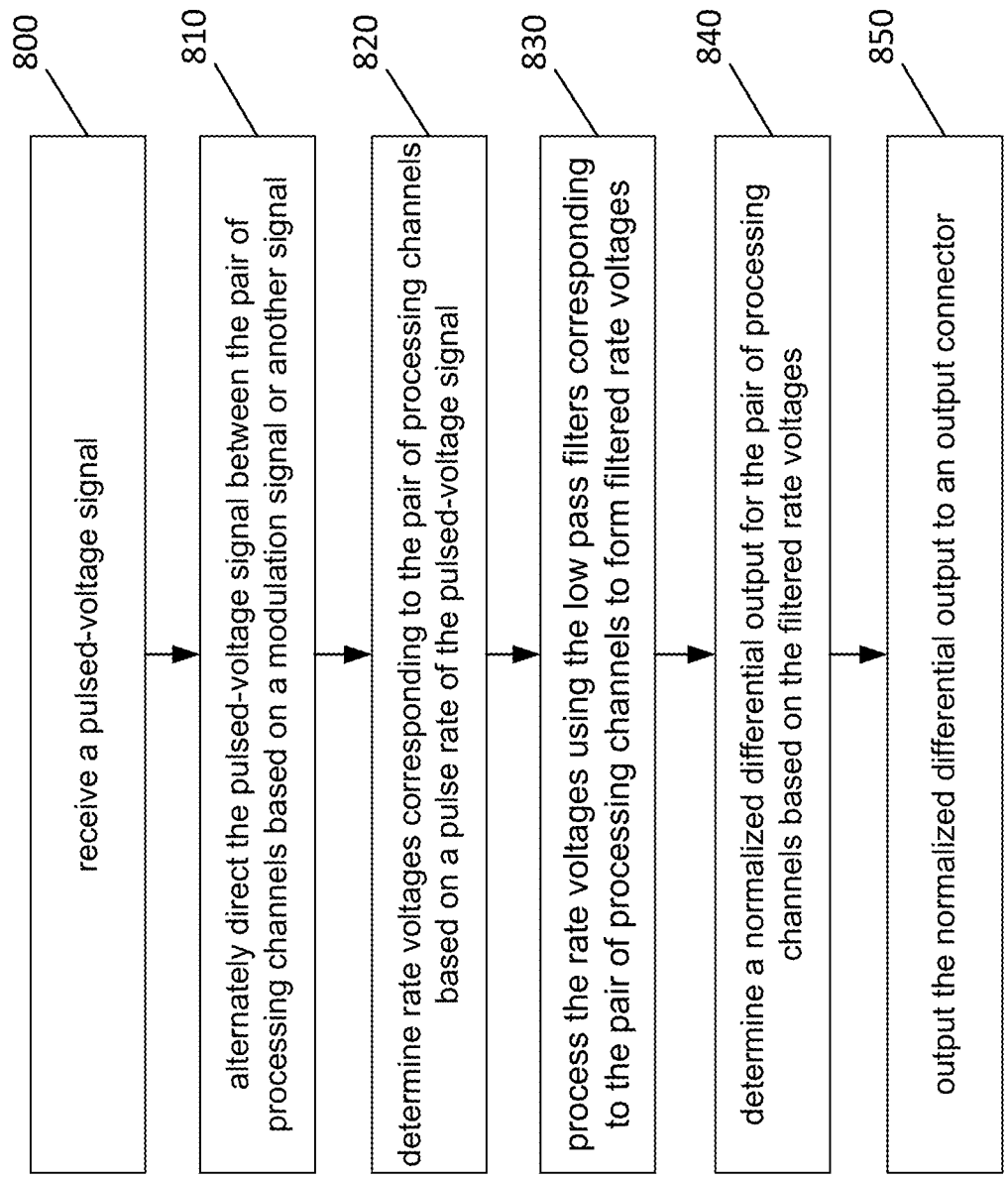
FIG. 8 illustrates a flow diagram of a method, according to an example embodiment.

FIG. 8 illustrates a flow diagram of a method, according to an example embodiment. In certain example embodiments, the flow diagram of FIG. 8 may be performed by a processing unit, such as rate meter 10 illustrated in FIG. 9.

According to one example embodiment, the method of FIG. 8 may include, at 800, receiving a pulsed-voltage signal. In some embodiments, the method of FIG. 8 may include generating, after receiving the pulsed-voltage signal, a modified pulsed-voltage signal by applying a uniform amplitude and a uniform duration to pulses of the pulsed-voltage signal.

In some embodiments, the method of FIG. 8 may include receiving, in association with receiving the pulsed-voltage signal, the modulation signal or said another signal. In some embodiments, the method of FIG. 8 may include determining, based on a modulation state of the modulation signal or said another signal, a processing channel, of the pair of processing channels, to which to direct the pulsed-voltage signal.

According to the example embodiment, the method of FIG. 8 may include, at 810, alternately directing the pulsed-voltage signal between a pair of processing channels based on a modulation signal or another signal. In some embodiments, the modulation signal may identify a frequency modulation or an amplitude modulation of a signal.

According to the example embodiment, the method of FIG. 8 may include, at 820, determining rate voltages corresponding to the pair of processing channels based on a pulse rate of the pulsed-voltage signal. In some embodiments, the rate voltages may be determined based on modified pulsed-voltage signal.

According to the example embodiment, the method of FIG. 8 may include, at 830, processing the rate voltages using low pass filters corresponding to the pair of processing channels to form filtered rate voltages. In some embodiments, the filtered rate voltages are time-averaged pulse rates corresponding to a first modulation state and a second modulation state.

According to the example embodiment, the method of FIG. 8 may include, at 840, determining a normalized differential output for the pair of processing channels based on the filtered rate voltages. In some embodiments, the method of FIG. 8 may include processing the normalized differential output using a low pass filter. The low pass filter may be different than the low pass filters corresponding to the pair of processing channels. In some embodiments, the normalized differential output may be determined by dividing a difference between a first filtered rate voltage, of the filtered rate voltages, and a second filtered rate voltage, of the filtered rate voltages, by a sum of the first filtered rate voltage and the second filtered rate voltage. The first filtered rate voltage may be associated with a first processing channel, of the pair of processing channels, and the second filtered rate voltage may be associated with a second processing channel of the pair of processing channels. According to the example embodiment, the method of FIG. 8 may include, at 850, outputting the normalized differential output to an output connector.

Figure 9:
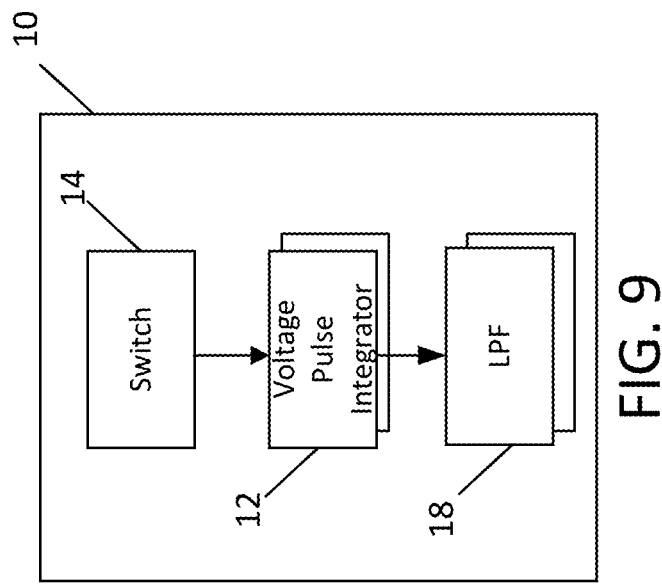
FIG. 9 illustrates an example block diagram of an apparatus, according to an embodiment.

FIG. 9 illustrates an example block diagram of an apparatus 10, according to an embodiment. In an example embodiment, apparatus 10 may be a rate meter in a system such as, for example, to transform discrete voltage pulses to a continuous signal.

As illustrated in the example of FIG. 9, apparatus 10 may include a switch 14 for alternately directing a signal between a pair of processing channels, as described elsewhere herein. Switch 14 may be any type of electrical circuit that can direct a signal or divert the signal to one processing channel or another. For example, switch 14 may include one or more electronic circuits, such as one or more logic gates on a chip. While a single switch 14 is shown in FIG. 9, multiple switches 14 may be utilized according to other example embodiments. For example, it should be understood that, in certain example embodiments, apparatus 10 may include two or more switches 14 for directing corresponding signals between corresponding pairs of processing channels. Switch 14 may perform functions associated with the operation of apparatus 10, which may include, for example, performing one or more operations illustrated, or described with respect to, FIGS. 1-8.

As illustrated in the example of FIG. 9, apparatus 10 may further include a voltage pulse integrator 12 for determining a rate voltage corresponding to a processing channel based on a pulse rate of a pulsed-voltage signal, as described elsewhere herein. Voltage pulse integrator 12 may be any type of circuit capable of performing these operations. As shown, multiple voltage pulse integrators 12 may be utilized according to some example embodiments. For example, it should be understood that, in certain example embodiments, apparatus 10 may include two or more voltage pulse integrators 12 for determining rate voltages corresponding to two or more processing channels. Voltage pulse integrator 12 may perform functions associated with the operation of apparatus 10, which may include, for example, performing one or more operations illustrated, or described with respect to, FIGS. 1-8.

As illustrated in the example of FIG. 9, apparatus 10 may further include a low-pass filter (LPF) 18 for processing a rate voltage corresponding to a processing channel and/or for processing a normalized differential output, as described elsewhere herein. LPF 18 may be any type of circuit that is capable of modifying, reshaping, or rejecting unwanted high frequencies of an electrical signal. As shown, multiple LPFs 18 may be utilized according to other example embodiments. For example, it should be understood that, in certain example embodiments, apparatus 10 may include two or more LPFs 12 corresponding to two or more processing channels. In addition, it should be understood that embodiments described herein may be modified to utilize a high pass filter or notch filter instead of a LPF. LPF 18 may perform functions associated with the operation of apparatus 10, which may include, for example, performing one or more operations illustrated, or described with respect to, FIGS. 1-8.

In addition, apparatus 10 may include one or more other electrical components not shown in FIG. 9 to perform one or more operations illustrated, or described with respect to, FIGS. 1-8. For example, apparatus 10 may include one or more additional circuits to determine a normalized differential output, as described elsewhere herein.

In addition, apparatus 10 may include one or more electrical components as input/output components for receiving a pulsed signal and/or for providing information to external devices. For example, the input/output components may include one or more antennas, one or more transceivers, one or more wire-to-board connectors, one or more cable ports, and/or the like. In this way, apparatus 10 may be connected, via wired or wireless connections, to one or more other electrical components and/or devices, such as a PID controller (e.g., PID controller 104, a voltage converter (e.g., voltage converter 106), a microwave source (e.g., microwave source 108), and/or a computing device, such as a computer or a server.

According to some example embodiments, apparatus 10 may, based on a configuration of switch 14, voltage pulse integrators 12, and LPFs 18, receive a pulsed-voltage signal. The apparatus 10 may also alternately direct the pulsed-voltage signal between the pair of processing channels based on a modulation signal or another signal. In addition, the apparatus 10 may determine rate voltages corresponding to the pair of processing channels based on a pulse rate of the pulsed-voltage signal. Further, the apparatus 10 may process the rate voltages using the low pass filters corresponding to the pair of processing channels to form filtered rate voltages. The apparatus 10 may also determine a normalized differential output for the pair of processing channels based on the filtered rate voltages. Further, the apparatus 10 may output the normalized differential output to an output connector.

In some example embodiments, the apparatus 10 may process the normalized differential output using a low pass filter prior to outputting the normalized differential output. The low pass filter may be different than the low pass filters corresponding to the pair of processing channels. In some example embodiments, the apparatus 10 may determine the normalized differential output by dividing a difference between a first filtered rate voltage, of the filtered rate voltages, and a second filtered rate voltage, of the filtered rate voltages, by a sum of the first filtered rate voltage and the second filtered rate voltage. The first filtered rate voltage may be associated with a first processing channel, of the pair of processing channels, and the second filtered rate voltage is associated with a second processing channel of the pair of processing channels.

The modulation signal may identify a frequency modulation or an amplitude modulation of a signal. The filtered rate voltages may be time-averaged pulse rates corresponding to a first modulation state and a second modulation state. In some example embodiments, the apparatus 10 may generate, after receiving the pulsed-voltage signal, a modified pulsed-voltage signal by applying a uniform amplitude and a uniform duration to pulses of the pulsed-voltage signal. In some example embodiments, the apparatus 10 may determine the rate voltages based on the modified pulsed-voltage signal. In some example embodiments, the apparatus 10 may receive, in association with receiving the pulsed-voltage signal, the modulation signal or said another signal. In some example embodiments, the apparatus 10 may determine, based on a modulation state of the modulation signal or said another signal, a processing channel, of the pair of processing channels, to which to direct the pulsed-voltage signal.

Certain example embodiments provide several technical improvements, enhancements, and/or advantages. Various example embodiments may, for example, provide for transforming discrete voltage pulses to a continuous signal, and in particular, without processing by a computer while maintaining a quality of results obtained. This embodiment conserves processing resources of a computer relative to conventional methods and ensures continuous processing uninterrupted by external demands on computer resources. In addition, certain example embodiments may provide for locking and tracking of magnetic resonance. Further, certain example embodiments may provide for implementation of closed-loop control of an experimental parameter with a conventional PID controller or other controller, thereby providing interoperability with conventional methods. Further, certain embodiments may provide for improved SNR when processing pulsed signals relative to other techniques, thereby improving processing of these types of signals.

One having ordinary skill in the art will readily understand that the example embodiments as discussed above may be practiced with steps in a different order, and/or with hardware elements in configurations which are different than those which are disclosed. Therefore, although some embodiments have been described based upon these preferred example embodiments, to those of skill in the art, certain modifications, variations, and alternative constructions would be apparent, while remaining within the spirit and scope of example embodiments. In order to determine the metes and bounds of the example embodiments, therefore, reference should be made to the appended claims.

We claim:

1. A method, comprising:
   receiving a pulsed-voltage signal;
   alternately directing the pulsed-voltage signal between a pair of processing channels based on a modulation signal or another signal;
   determining rate voltages corresponding to the pair of processing channels based on a pulse rate of the pulsed-voltage signal;
   processing the rate voltages using low pass filters corresponding to the pair of processing channels to form filtered rate voltages;
   determining a normalized differential output for the pair of processing channels based on the filtered rate voltages; and
   outputting the normalized differential output to an output connector.

2. The method according to claim 1, further comprising:
processing the normalized differential output using a low pass filter prior to outputting the normalized differential output, wherein the low pass filter is different than the low pass filters corresponding to the pair of processing channels.

3. The method according to claim 1, wherein determining the normalized differential output comprises:
determining the normalized differential output by dividing a difference between a first filtered rate voltage, of the filtered rate voltages, and a second filtered rate voltage, of the filtered rate voltages, by a sum of the first filtered rate voltage and the second filtered rate voltage,
wherein the first filtered rate voltage is associated with a first processing channel, of the pair of processing channels, and the second filtered rate voltage is associated with a second processing channel of the pair of processing channels.

4. The method according to claim 1, wherein the modulation signal identifies a frequency modulation or an amplitude modulation of a signal.

5. The method according to claim 1, wherein the filtered rate voltages are time-averaged pulse rates corresponding to a first modulation state and a second modulation state.

6. The method according to claim 1, further comprising:
generating, after receiving the pulsed-voltage signal, a modified pulsed-voltage signal by applying a uniform amplitude and a uniform duration to pulses of the pulsed-voltage signal; and
wherein determining the rate voltages comprises:
determining the rate voltages based on the modified pulsed-voltage signal.

7. The method according to claim 1, further comprising:
receiving, in association with receiving the pulsed-voltage signal, the modulation signal or said another signal; and
determining, based on a modulation state of the modulation signal or said another signal, a processing channel, of the pair of processing channels, to which to direct the pulsed-voltage signal.

8. An apparatus, comprising:
a switch configured at least to:
receive a pulsed-voltage signal, and
alternately direct the pulsed-voltage signal between a pair of processing channels based on a modulation signal or another signal;
voltage pulse integrators, corresponding to the pair of processing channels, configured at least to:
determine rate voltages corresponding to the pair of processing channels based on a pulse rate of the pulsed-voltage signal;
low pass filters, corresponding to the pair of processing channels, configured at least to:
process the rate voltages to form filtered rate voltages; and circuitry configured at least to:
determine a normalized differential output for the pair of processing channels based on the filtered rate voltages, and
output the normalized differential output to an output connector.

9. The apparatus according to claim 8, further comprising:
a low pass filter configured at least to:
process the normalized differential output prior to outputting the normalized differential output, wherein the low pass filter is different than the low pass filters corresponding to the pair of processing channels.

10. The apparatus according to claim 8, wherein the circuitry, when determining the normalized differential output, is configured at least to:
determine the normalized differential output by dividing a difference between a first filtered rate voltage, of the filtered rate voltages, and a second filtered rate voltage, of the filtered rate voltages, by a sum of the first filtered rate voltage and the second filtered rate voltage,
wherein the first filtered rate voltage is associated with a first processing channel, of the pair of processing channels, and the second filtered rate voltage is associated with a second processing channel of the pair of processing channels.

11. The apparatus according to claim 8, wherein the modulation signal identifies a frequency modulation or an amplitude modulation of a signal.

12. The apparatus according to claim 8, wherein the filtered rate voltages are time-averaged pulse rates corresponding to a first modulation state and a second modulation state.

13. The apparatus according to claim 8, wherein the switch is further configured at least to:
generate, after receiving the pulsed-voltage signal, a modified pulsed-voltage signal by applying a uniform amplitude and a uniform duration to pulses of the pulsed-voltage signal, and
wherein the voltage pulse integrators, when determining the rate voltages, are configured at least to:
determine the rate voltages based on the modified pulsed-voltage signal.

14. The apparatus according to claim 8, wherein the switch is further configured at least to:
receive, in association with receiving the pulsed-voltage signal, the modulation signal or said another signal, and
determine, based on a modulation state of the modulation signal or said another signal, a processing channel, of the pair of processing channels, to which to direct the pulsed-voltage signal.

15. A rate meter, comprising:
means for receiving a pulsed-voltage signal;
means for alternately directing the pulsed-voltage signal between a pair of processing channels based on a modulation signal or another signal;
means for determining rate voltages corresponding to the pair of processing channels based on a pulse rate of the pulsed-voltage signal;
means for processing the rate voltages using low pass filters corresponding to the pair of processing channels to form filtered rate voltages;
means for determining a normalized differential output for the pair of processing channels based on the filtered rate voltages; and
means for outputting the normalized differential output to an output connector.

16. The rate meter according to claim 15, further comprising:
means for processing the normalized differential output using a low pass filter prior to outputting the normalized differential output, wherein the low pass filter is different than the low pass filters corresponding to the pair of processing channels.

17. The rate meter according to claim 15, wherein the means for determining the normalized differential output comprises:
means for determining the normalized differential output by dividing a difference between a first filtered rate voltage, of the filtered rate voltages, and a second filtered rate voltage, of the filtered rate voltages, by a sum of the first filtered rate voltage and the second filtered rate voltage,
wherein the first filtered rate voltage is associated with a first processing channel, of the pair of processing channels, and the second filtered rate voltage is associated with a second processing channel of the pair of processing channels.

18. The rate meter according to claim 15, wherein the modulation signal identifies a frequency modulation or an amplitude modulation of a signal.

19. The rate meter according to claim 15, wherein the filtered rate voltages are time-averaged pulse rates corresponding to a first modulation state and a second modulation state.

20. The rate meter according to claim 15, further comprising:
   means for generating, after receiving the pulsed-voltage signal, a modified pulsed-voltage signal by applying a uniform amplitude and a uniform duration to pulses of the pulsed-voltage signal; and
   wherein the means for determining the rate voltages comprises:
      means for determining the rate voltages based on the modified pulsed-voltage signal.

* * * * *